Dec. 30, 1947.  O. SASLAW  2,433,402

SELENIUM CELL AND LACQUER THEREFOR

Filed July 2, 1942

INVENTOR.
OTTO SASLAW
BY
ATTORNEY.

Patented Dec. 30, 1947

2,433,402

UNITED STATES PATENT OFFICE 2,433,402

SELENIUM CELL AND LACQUER THEREFOR

Otto Saslaw, Kearny, N. J., assignor to Federal Telephone and Radio Corporation, a corporation of Delaware Application July 2, 1942, Serial No. 449,529

6 Claims. (Cl. 175—366)

This invention relates to lacquers and particularly to lacquers for coating the selenium of selenium cells and selenium coated with such lacquer. The subject matter of this application is related to the subject matter of applicant's co-pending applications No. 501,532, Patent No. 2,386,750, and No. 530,181, filed April 8, 1944.

The object of this invention is to improve the voltage and rectifier characteristics of selenium cells.

The improvement is carried out according to this invention by the application to the selenium surface of a lacquer containing cellulose acetate and preferably containing selenium dioxide, which upon drying leaves a layer which enables the voltage across the cell to be increased and also reduces the undesirable current which flows in the reverse direction.

Selenium rectifier plates are ordinarily made by coating selenium on a base plate and heat-treating it to crystallize the selenium and enable it to perform a rectifying function. According to theory, when the selenium is treated in this manner a so-called blocking layer forms on the surface thereof, at least when a voltage is applied thereto, which has the property of conducting more current in one direction than in the other, thereby providing the rectifying characteristic. The voltage which may be applied across such a plate is rather limited and likewise the current flowing in the reverse direction is often greater than desired.

In accordance with my invention I have succeeded in increasing the voltage which can be applied across the cell and reducing the current flowing in the reverse direction. I have done this by coating the annealed selenium surface with a lacquer containing cellulose acetate which upon drying leaves a film on the surface of the selenium. The lacquer should preferably contain some selenium dioxide as this will result in very little reduction of the forward conductivity while the reduction in the reverse conductivity will be relatively very great. If the selenium dioxide be omitted there will still be realized a substantial decrease in reverse conductivity and increase in the voltage which may be applied, but the forward conductivity is apt also to be considerably harmed.

Figure 1:
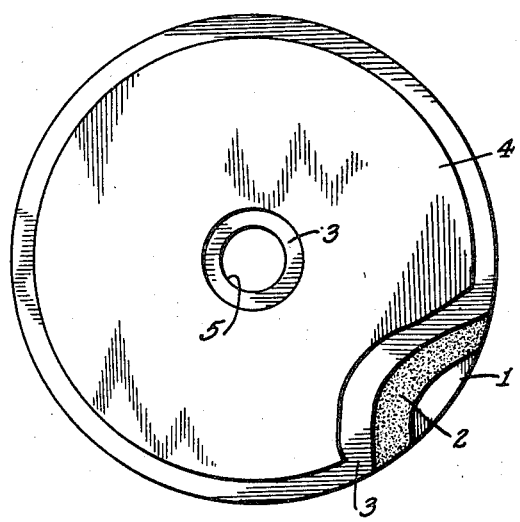
Figure 2:
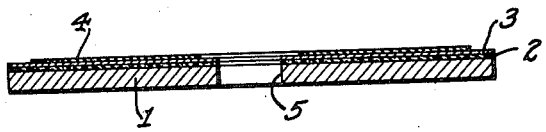

The invention will be better understood from the following detailed description and the accompanying drawings of which Fig. 1 is a plan view and Fig. 2 a side elevation in cross section of a selenium cell having a lacquered selenium in accordance with this invention.

Figs. 1 and 2 show a well known type of selenium disc such as is used for a rectifier. It comprises a base plate 1, ordinarily of steel on which is placed a layer of selenium 2. The selenium may be applied in any suitable manner such as melting amorphous selenium powder and spreading the molten selenium over the base plate and then allowing it to cool and harden. The selenium should then be annealed in a well known manner by heating it for a period of time at a temperature below the melting point to induce crystallization and enable the cell to operate properly as a rectifier. A suitable way of carrying out this heat treatment is first to compress the selenium coated disc in a press and heat it for about a half hour at a temperature of about 120° C., then remove the presusre and raise the temperature to about 214° C. for some hours. In accordance with my invention there is then applied to the surface of the annealed selenium a layer of lacquer 3 made as described in detail below. In order to use this device as a rectifier a counter-electrode 4 should then be applied over layer 3 by spraying on a suitable metallic alloy such as an alloy of cadmium, bismuth and tin.

I have found that the following proportions are satisfactory for the lacquer: 3 parts by weight of selenium dioxide, 4 parts by weight of a heavy cellulose acetate lacquer, and 60 parts by weight of a volatile thinner. For the heavy cellulose acetate lacquer I have found that four grams of cellulose acetate dissolved in a thinner of about sixty grams of ethylene glycol mono-methyl ether acetate, also known under the trade name of methyl "Cellosolve" acetate is suitable, and this may be used as the four parts of heavy lacquer in the above proportions. The methyl "Cellosolve" acetate is the best known solvent for the cellulose acetate which will not harm the blocking layer. The proportions given above are not necessarily critical and may vary within considerably wide limits. For example, the 60 parts by weight of the volatile thinner may be varied by as much as plus or minus 20 or 30 parts; the three parts of selenium dioxide could, for example, be increased to as much as eight parts, or on the other hand might be decreased practically to zero (with corresponding decreased forward conductivity).

A good way I have found of making the lacquer is to provide separately three component parts which will here be designated as part A, part B and part C. Part A is made by mixing 60 parts of methyl "Cellosolve" acetate and about 2 parts of cellulose acetate. Part B is a pure thinner of methyl "Cellosolve" acetate. Part C is a 5% solution of selenium dioxide in absolute ethyl alcohol. When it is desired to apply the lacquer by spraying, satisfactory proportions of these three components are 1 part A, 5 parts of B and 5 parts of C. The 5 parts of B (methyl "Cellosolve" acetate), could, of course, be varied to make the lacquer as thin as desired, and the 5 parts of C could considerably be varied for example within a range of from 2 to 10 parts of C.

The lacquer may be applied to the selenium surface to form the layer 3 in any convenient manner as by brushing or by spraying. The thinner will volatilize leaving as the base a very thin skin probably of about molecular thickness, formed principally by the cellulose acetate and such selenium dioxide as is used in the lacquer.

What is claimed is:

1. A selenium cell comprising a selenium surface, a coating thereon from a lacquer comprising cellulose acetate dissolved in a thinner of ethylene glycol mono-methyl ether acetate and some selenium dioxide, and a counter-electrode alloy layer on said coating.

2. The method of treating a selenium cell which includes the step of applying to the rectifying surface of the selenium, a lacquer comprising cellulose acetate dissolved in a thinner of ethylene glycol mono-methyl ether acetate, said lacquer containing some selenium dioxide.

3. A selenium cell comprising a selenium surface, a film on said surface of a lacquer comprising 4 parts by weight of cellulose acetate, 3 parts by weight of selenium dioxide and 60 parts by weight of ethylene glycol mono-methyl ether acetate, and a counter-electrode alloy layer on said film.

4. A selenium cell comprising a selenium surface, a film on said surface from a lacquer comprising a heavy lacquer of about 2 parts of cellulose acetate dissolved in about 60 parts of ethylene glycol mono-methyl ether acetated, said heavy lacquer being dissolved in a thinner of ethylene glycol mono-methyl ether acetate, and a quantity of selenium dioxide dissolved in ethyl alcohol, and a counter-electrode alloy layer on said film.

5. The method of making a selenium rectifier, which includes the steps of coating a selenium surface with a lacquer containing cellulose acetate dissolved in ethylene glycol mono-methyl ether acetate, and applying a counter-electrode alloy layer on said coating.

6. A selenium rectifier comprising means forming a selenium surface, a lacquer of cellulose acetate dissolved in a thinner of ethylene glycol mono-methyl ether acetate covering said selenium surface, and a counter-electrode alloy layer over said lacquer.

OTTO SASLAW.

REFERENCES CITED

The following references are of record in the file of this patent:

UNITED STATES PATENTS

| Number | Name | Date |
| --- | --- | --- |
| 2,017,842 | Conant | Oct. 22, 1935 |
| 2,126,765 | Freeman | Aug. 16, 1938 |
| 2,134,131 | Kipphan | Oct. 25, 1938 |
| 1,521,876 | Farrow | Jan. 6, 1925 |
| 1,544,809 | Clancy | July 7, 1925 |
| 2,132,869 | Fordyce | Oct. 11, 1938 |
| 2,139,731 | Boer et al. | Dec. 13, 1938 |
| 2,137,428 | Van Geel et al. | Nov. 22, 1938 |
| 2,386,750 | Saslaw | Oct. 16, 1945 |
| 2,197,497 | Geisler | Apr. 16, 1940 |